Nov. 19, 1935.   W. P. STOUGH   2,021,334
CAPONIZING DEVICE
Filed Feb. 15, 1934   2 Sheets-Sheet 1

INVENTOR
William P. Stough
BY
Chappell & Earl
ATTORNEYS

Nov. 19, 1935.  W. P. STOUGH  2,021,334
CAPONIZING DEVICE
Filed Feb. 15, 1934  2 Sheets-Sheet 2
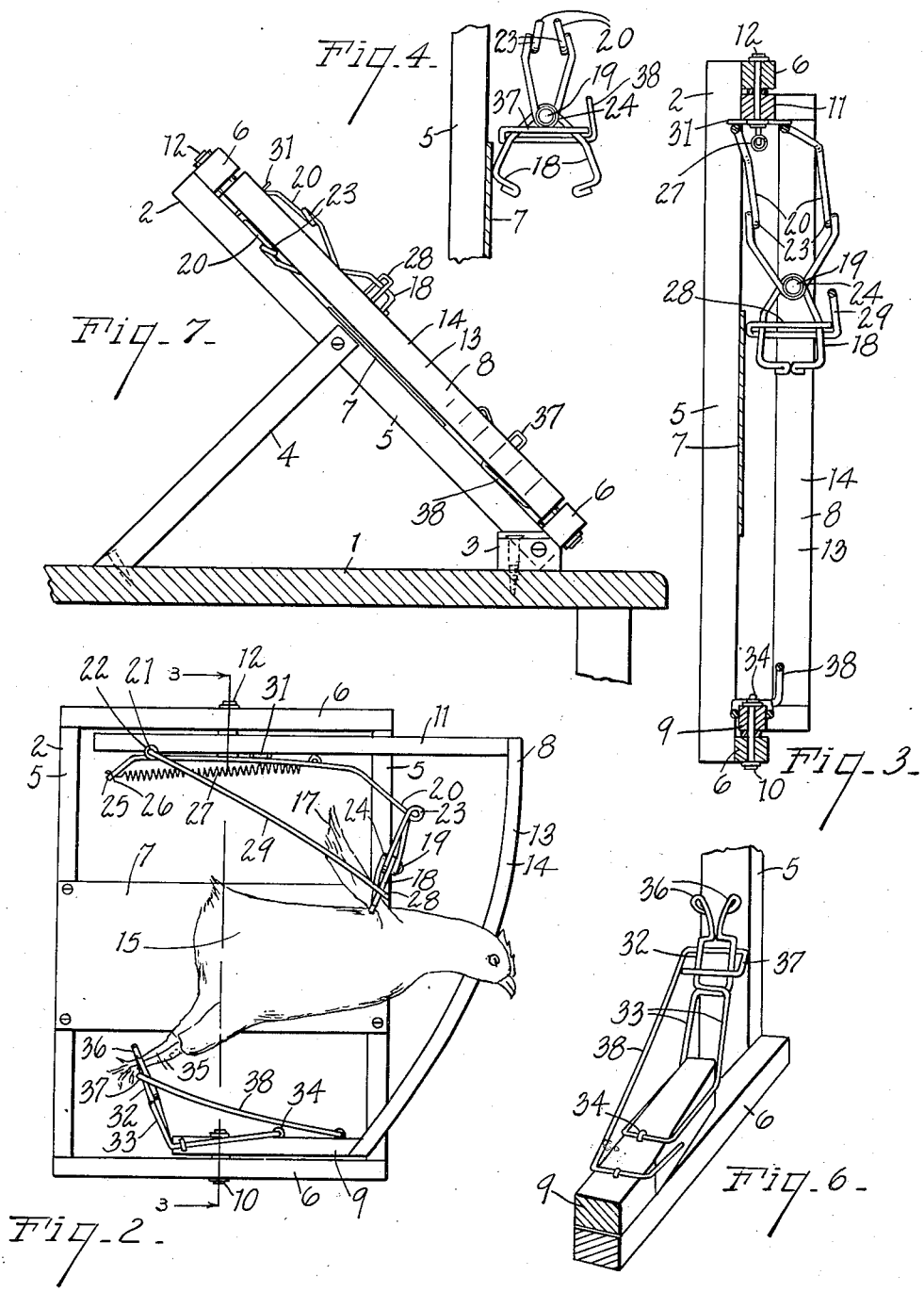
INVENTOR
William P. Stough
BY
Chappell & Earl
ATTORNEYS Patented Nov. 19, 1935

2,021,334

UNITED STATES PATENT OFFICE 2,021,334

CAPONIZING DEVICE

William P. Stough, Sherwood, Mich.

Application February 15, 1934, Serial No. 711,380

12 Claims. (Cl. 128—306)

The main objects of this invention are:

First, to provide an improved means for holding fowls for caponizing operations.

Second, to provide in such a means an improved fowl holding means which effectively holds the fowl and one in which the fowl can be reversed on the operating table so that both incisions may be made before releasing the fowl.

Third, to provide a device of this character which is simple and economical in its parts and very efficient and effective for the purpose intended.

Objects relating to details and economies of my invention will appear from the description to follow. The invention is defined and pointed out in the claims.

A structure which is a preferred embodiment of my invention is illustrated in the accompanying drawings, in which:

Fig. 2 is a view similar to Fig. 1, showing the fowl in reversed position and held for incision on its other side.

Fig. 3 is an enlarged vertical section on a line corresponding to line 3—3 of Fig. 2, the fowl being omitted.

Fig. 4 is a detail view similar to Fig. 3, showing the wing holding jaws open.

Fig. 6 is a fragmentary perspective view showing the foot holding means.

Fig. 7 is an end elevation of my device in position for use, the support being shown in section.

Figure 1:
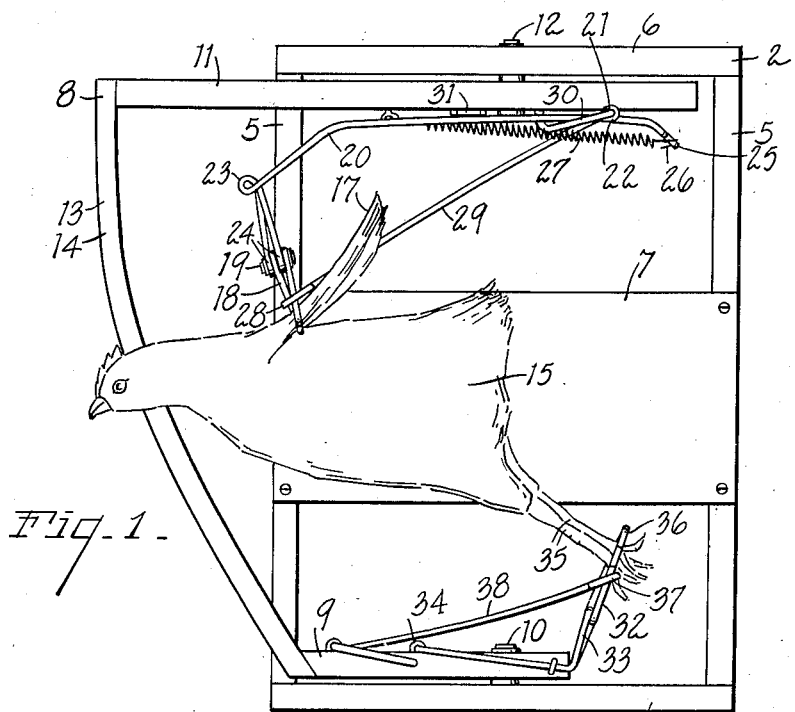
Fig. 1 is a top plan view of a caponizing device embodying the features of my invention, in use, the fowl being held for incision on one side.
Figure 5:
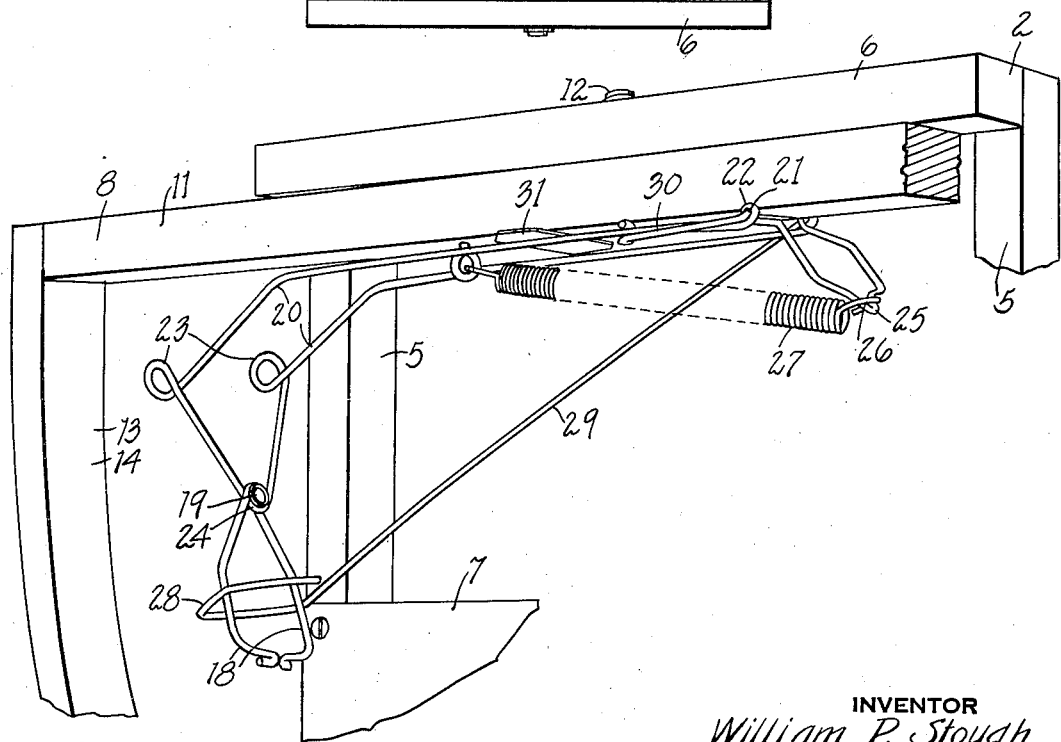
Fig. 5 is an enlarged fragmentary perspective view showing the wing holding means.

In the embodiment of my invention illustrated by the drawings, numeral 1 indicates a support such as a bench which is conventionally illustrated. The inclined substantially rectangular frame 2 is mounted on the bench 1 by means of the bracket 3 and the strut 4, these parts being duplicated at each end of the frame. The frame consists of a pair of spaced uprights 5, 5, upper and lower cross members 6, 6 mounted on said uprights at the ends thereof, and a transverse operating table 7 mounted at its ends on the uprights and spaced from the upper and lower cross members as shown.

Within the rectangular frame 2, I provide a swinging frame 8 consisting of a relatively short bottom bar 9 pivoted intermediate its ends at 10 to the center of the lower cross member, a relatively long top bar 11 pivoted intermediate its ends at 12 to the center of the upper cross member and a curved member 13 connecting the outer ends of the bars and providing a head piece 14 substantially spaced from the uprights 5. The head piece is spaced from the uprights so that the head of the fowl indicated at 15 will not be injured when the frame 8 is turned to reverse the fowl. The lower portion of the member 13 is curved inwardly as shown so as to be out of the way of the operator when the swinging frame is swung from one side of the operating table to the other.

The wings 17 of the fowl are engaged in clamping jaws 18 pivoted at 19 and carried by spring arms 20 which are in turn pivoted on the bar 11 at 21, eyes 22 being formed in the arms to engage the pivot 21. The arms have loops or coils therein adjacent the jaws to provide finger pieces 23 which may be grasped to open the jaws. The spring arms act to normally close the jaws. The arms and jaws are preferably formed of a single piece of wire, the bight portion 24 forming an arm terminating in a lug portion 25 which is engaged by the hook 26 on the coiled spring 27. This coil spring acts to urge the jaws upwardly, yieldingly holding the fowl and adapting the device to fowls of different sizes.

To hold the wings within the jaws, I provide a loop-like keeper 28 carried by the spring arm 29 tensioned to urge the keeper toward the outer end of the jaws and thus effectively retain the wings within the jaws. This spring arm 29 is shaped to provide the pivot 21 and terminates in an arm 30 engaged over one of the arms 20 for holding the arm 29 under tension.

A stop 31 is provided on the upper bar for limiting the outward swing of the jaws 18.

I provide foot holding jaws 32 carried by spring arms 33, the jaws and arms being preferably formed integrally, the arms being closed at the bases of the jaws and tensioned so that they act to urge the jaws to closed position. These jaws and arms are, in the embodiment illustrated, formed of a single piece of wire bent upon itself and secured to the lower holder bar by means of a staple 34. The legs 35 of the fowl are engaged in these jaws 32 which preferably terminate in outwardly diverging guide portions 36 so that the legs of the fowl may be pushed into the jaws. Carried by the spring arms, the leg and wing clamping jaws may spring or yield so that the fowl is not likely to injure itself in straining to be free.

A loop-like keeper 37 is provided for the leg clamping jaws, this keeper being carried by a spring arm 33. This spring arm urges the keeper towards the outer ends of the jaws and prevents the fowl from the withdrawing its feet from the jaws.

The fowl 15 is placed in my caponizing device by first holding it by the wings 17 with one hand and by its feet or legs 35 with the other hand. The legs are slipped into the spring jaws 32 in the manner pointed out above and the wing holding jaws 18 are then advanced through the keeper 28 and opened, whereupon the bases of the wings 17 are placed therein and the finger pieces released. The keepers coact with the wing and foot holding jaws to prevent the fowl from pulling itself free of the holding means. At the same time, the spring 27 acts to stretch the fowl between the foot and wing holding means so that its body is properly held on the operating table. With the fowl in this position on one side, the operation or incision is made, after which the swinging frame 8 is turned through an arc of approximately 180° so as to invert the fowl and place it on its other side. With the fowl held in the latter position, a similar operation or incision is made whereupon the fowl is released by opening the wing and foot holding means.

With my apparatus, it is unnecessary to release the fowl until the entire caponizing operation is performed.

While I have described my invention as a caponizing device, it will be appreciated by those skilled in the art and others, such as surgeons, that the device is capable of use in other relations where it is necessary to invert the animal or patient on the operating table.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A caponizing device comprising an inclined substantially rectangular frame having a transverse operating table spaced from the upper and lower cross members thereof, a swinging frame pivoted to said cross members for inverting the fowl and having a relatively short bottom bar and a relatively long top bar connected at their outer ends by an outwardly curved head piece, spring closed foot holding means associated with the inner end of said bottom bar, spring closed wing holding means associated with the inner end of said top bar, said foot and wing holding means being arranged to hold the fowl with its body on said operating table, and resilient means associated with said wing holding means for stretching the fowl between said foot and wing holding means.

2. A caponizing device comprising a rectangular frame having a transverse operating table spaced from the upper and lower cross members thereof, a swinging frame pivoted to said cross members for inverting the fowl and having a head piece, spring closed foot holding means associated with the inner end of said bottom bar, spring closed wing holding means associated with the inner end of said top bar, said foot and wing holding means being arranged to hold the fowl with its body on said operating table, and resilient means associated with said wing holding means for stretching the fowl between said foot and wing holding means.

3. A caponizing device comprising an inclined frame having a central transverse operating table, a swinging frame pivoted to said inclined frame for transverse movement through an arc of 180° and having upper and lower bars, wing holding means on said upper bar comprising a spring wire holder of U shape having its cross piece looped to provide a hook and its arms bent to provide opposed pivot loops, hinged spring jaws, and handles for opening the latter, a spring wire keeper secured at its inner end to said upper bar and providing a pivot for said pivot loops and having a loop at its other end surrounding said spring jaws for coaction therewith to prevent the fowl from releasing its wings from said jaws, said pivot having an arm connected to an arm of said holder, a tension spring connecting said hook to said upper bar, a stop on said upper bar for limiting the outward movement of said holder under the influence of said spring, and foot holding means on said lower bar for coaction with said wing holding means to stretch the body of the fowl on said operating table.

4. A caponizing device comprising an operating table, a swinging frame having upper and lower bars, wing holding means on said upper bar comprising a spring wire holder of U shape having its cross piece looped to provide a hook and its arms bent to provide opposed pivot loops, hinged spring jaws, and handles for opening the latter, a spring wire keeper secured at its inner end to said upper bar and providing a pivot for said pivot loops and having a loop at its other end surrounding said spring jaws for coaction therewith to prevent the fowl from releasing its wings from said jaws, said pivot having an arm connected to an arm of said holder, a spring connecting said hook to said upper bar, and foot holding means on said lower bar for coaction with said wing holding means to stretch the body of the fowl on said operating table.

5. A caponizing device comprising an operating table, a swinging frame having upper and lower bars, wing holding means on said upper bar comprising a spring wire holder of U shape having its cross piece looped to provide a hook and its arms bent to provide opposed pivot loops, hinged spring jaws, and handles for opening the latter, a spring connecting said hook to said upper bar, and foot holding means on said lower bar for coaction with said wing holding means to stretch the body of the fowl on said operating table.

6. A caponizing device comprising an inclined frame having a central transverse operating table, a swinging frame pivoted to said inclined frame for transverse movement through an arc of 180° and having upper and lower bars, foot holding means on said lower bar comprising a spring wire holder of U shape having its cross piece secured to the top of said lower bar and its arms secured to the sides thereof, the arms being bent to provide coacting spring jaws, and a spring wire keeper secured at one end of said lower bar and having a loop at its other end surrounding said spring jaws for coaction therewith to prevent the fowl from pulling its feet through said jaws, and wing holding means on said upper bar for coaction with said foot holding means to stretch the body of the fowl on said operating table.

7. A caponizing device comprising an operating table, a swinging frame having upper and lower bars, foot holding means on said lower bar comprising a spring wire holder of U shape having its cross piece secured to the top of said lower bar and its arms secured to the sides thereof, the arms being bent to provide coacting spring jaws, and wing holding means on said upper bar for coaction with said foot holding means to stretch the body of the fowl on said operating table.

8. A device of the class described comprising a table, a holder pivotally associated with said table, leg clamping jaws carried by spring arms mounted on said holder and acting to normally urge the jaws to closed position, a loop-like keeper embracing said jaws and carried by a spring arm acting to urge the keeper toward the outer ends of the jaws, pivoted wing holding jaws provided with spring arms acting to close the jaws and pivoted on said holder, a spring acting on said arms to hold said wing engaging jaws yieldingly outward, and a loop-like keeper embracing said wing jaws and carried by a spring arm acting to urge the keeper towards the outer ends of the jaws.

9. A device of the class described, comprising a table, a holder pivotally associated with said table, leg clamping jaws carried by spring arms mounted on said holder and acting to normally urge the jaws to closed position, pivoted wing holding jaws provided with spring arms acting to close the jaws and pivoted on said holder, and a spring acting on said arms to hold said wing engaging jaws yieldingly outward.

10. A device of the class described comprising a table, a holder pivotally associated with said table, leg clamping jaws carried by spring arms mounted on said holder and acting to normally urge the jaws to closed position, said jaws terminating in outwardly diverging guide portions, and a loop-like keeper embracing said jaws and carried by a spring arm acting to urge the keeper toward the outer ends of the jaws.

11. A device of the class described comprising a table, a holder frame comprising pivoted top and bottom bars connected at their outer ends only, their pivots being alined and in approximately the plane of the table, a spring supported leg clamp carried by said bottom bar, and a spring supported wing clamp carried by said top bar.

12. A device of the class described comprising a table, a holder pivotally associated with said table, spring supported leg clamping jaws carried by the bottom bar, and spring supported wing holding jaws carried by the top bar.

WILLIAM P. STOUGH.